(12) United States Patent
Festag et al.

(10) Patent No.: US 8,752,863 B2
(45) Date of Patent: Jun. 17, 2014

(54) VEHICLE SEAT ASSEMBLY WITH AIR BAG MODULE HAVING INTEGRAL PROTECTION MEMBER

(75) Inventors: Peter Festag, Erding (DE); Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/558,737

(22) Filed: Jul. 26, 2012

(65) Prior Publication Data
US 2013/0082494 A1  Apr. 4, 2013

(30) Foreign Application Priority Data

Sep. 29, 2011 (DE) .......................... 10 2011 083 758

(51) Int. Cl.
B60R 21/18 (2006.01)
B60R 21/207 (2006.01)

(52) U.S. Cl.
USPC .................. 280/730.2; 280/728.2; 280/728.3; 280/730.1; 297/216.1; 297/216.13

(58) Field of Classification Search
USPC ..................... 280/728.2, 728.3, 730.1, 730.2; 297/216.1, 216.3
See application file for complete search history.

(56) References Cited

U.S. PATENT DOCUMENTS

| | | | |
|---|---|---|---|
| 5,906,390 A * | 5/1999 | Phillion et al. | 280/728.3 |
| 5,988,674 A * | 11/1999 | Kimura et al. | 280/730.2 |
| 6,045,151 A | 4/2000 | Wu | |
| 6,237,934 B1 | 5/2001 | Harrell et al. | |
| 6,341,797 B1 * | 1/2002 | Seo | 280/730.2 |
| 6,386,577 B1 | 5/2002 | Kan et al. | |
| 8,176,863 B2 * | 5/2012 | Evans et al. | 112/475.08 |
| 2002/0130495 A1 | 9/2002 | Lotspih et al. | |
| 2007/0278773 A1 * | 12/2007 | Cowelchuck et al. | 280/732 |
| 2008/0061539 A1 | 3/2008 | Paruszkiewicz et al. | |
| 2008/0217887 A1 | 9/2008 | Seymour et al. | |
| 2008/0284143 A1 * | 11/2008 | Smith et al. | 280/730.2 |
| 2010/0230937 A1 | 9/2010 | Thomas et al. | |
| 2011/0095578 A1 * | 4/2011 | Festag | 297/216.1 |
| 2011/0193327 A1 | 8/2011 | Tracht et al. | |

FOREIGN PATENT DOCUMENTS

| | | |
|---|---|---|
| DE | 19824735 A1 | 12/1999 |
| DE | 112008003873 T5 | 5/2011 |
| DE | 102010001772 A1 | 8/2011 |
| GB | 2398546 * | 8/2004 |

OTHER PUBLICATIONS

German Office Action Dated Apr. 27, 2012, Applicant Lear Corporation, Application No. 10 2011 083 758.2, 8 Pages.
Amendment Under 37 C.F.R. 1.116 submitted to PTO Oct. 8, 2013, U.S. Appl. No. 12/940,089, filed Nov. 5, 2010—Vehicle Seat Assembly With Seat Pad Protection Member, 7 pages.

* cited by examiner

Primary Examiner — Ruth Ilan
Assistant Examiner — Darlene P Condra
(74) Attorney, Agent, or Firm — Brooks Kushman P.C.

(57) ABSTRACT

A vehicle seat assembly may include an air bag module having an inflatable air bag and a housing that receives the air bag. The housing has a main body that substantially encloses the air bag prior to inflation of the air bag, and an extension formed integrally with the main body. The extension is substantially enclosed by the main body prior to inflation of the air bag, and the extension has an end. Upon inflation of the air bag, the end of the extension is configured to extend outside the main body such that the end extends between the air bag and a component of the seat assembly.

20 Claims, 5 Drawing Sheets

US 8,752,863 B2

VEHICLE SEAT ASSEMBLY WITH AIR BAG MODULE HAVING INTEGRAL PROTECTION MEMBER

CROSS-REFERENCE TO RELATED APPLICATIONS

This application claims foreign priority benefits under 35 U.S.C. §119(a)-(d) to DE 10 2011 083 758.2, filed Sep. 29, 2011, the disclosure of which is hereby incorporated by reference in its entirety.

TECHNICAL FIELD

The present disclosure relates to a vehicle seat assembly having an inflatable air bag.

BACKGROUND

Vehicle seat assemblies may be provided with inflatable air bags. U.S. Pat. Nos. 6,045,151 and 6,237,934 disclose examples of such vehicle seat assemblies.

SUMMARY

A vehicle seat assembly according to an embodiment of the present disclosure comprises an air bag module including an inflatable air bag and a housing that receives the air bag. The housing has a main body that substantially encloses the air bag prior to inflation of the air bag, and an extension formed integrally with the main body. The extension is substantially enclosed by the main body prior to inflation of the air bag, and the extension has an end. Upon inflation of the air bag, the end of the extension is configured to extend outside the main body such that the end extends between the air bag and a component of the seat assembly.

An air bag module, according to the present disclosure, for use with a vehicle seat includes an inflatable air bag and a housing that receives the air bag. The housing has a main body that substantially encloses the air bag prior to inflation of the air bag, and an extension formed integrally with the main body. The extension is substantially enclosed by the main body prior to inflation of the air bag, and the extension has an end. Upon inflation of the air bag, the end of the extension is configured to extend outside the main body such that the end extends between the air bag and a component of the seat assembly.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various vehicle seat configurations that include an inflatable air bag assembly. Several specific embodiments are set forth in the following description and in FIGS. 1-8 to provide a thorough understanding of certain embodiments according to the present disclosure. As those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without several of the specific features explained in the following description.

Figure 1:
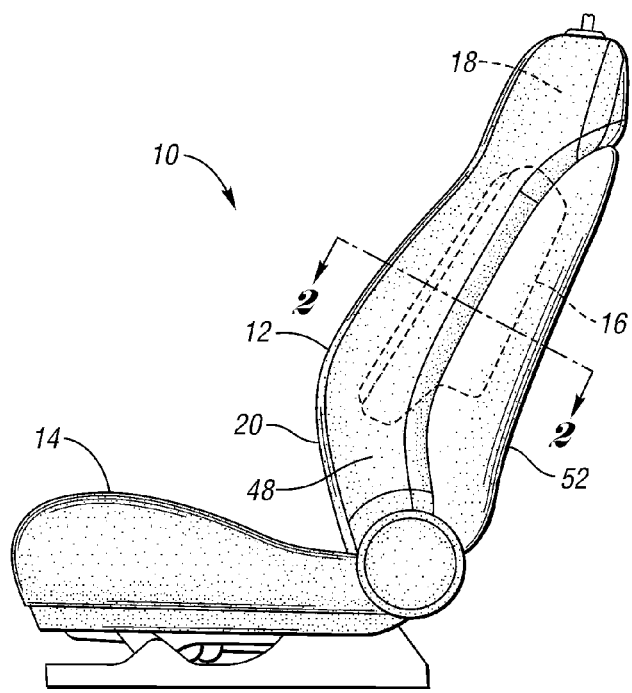
FIG. 1 is a side view of a vehicle seat assembly according to the present disclosure and including an air bag module positioned in a seat back cushion assembly.

FIG. 1 shows a vehicle seat assembly 10 according to the present disclosure for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as an air bag module 16, a seat pad 18 overlaying the air bag module 16, and a trim cover 20 overlaying the seat pad 18 and air bag module 16.

Figure 2:
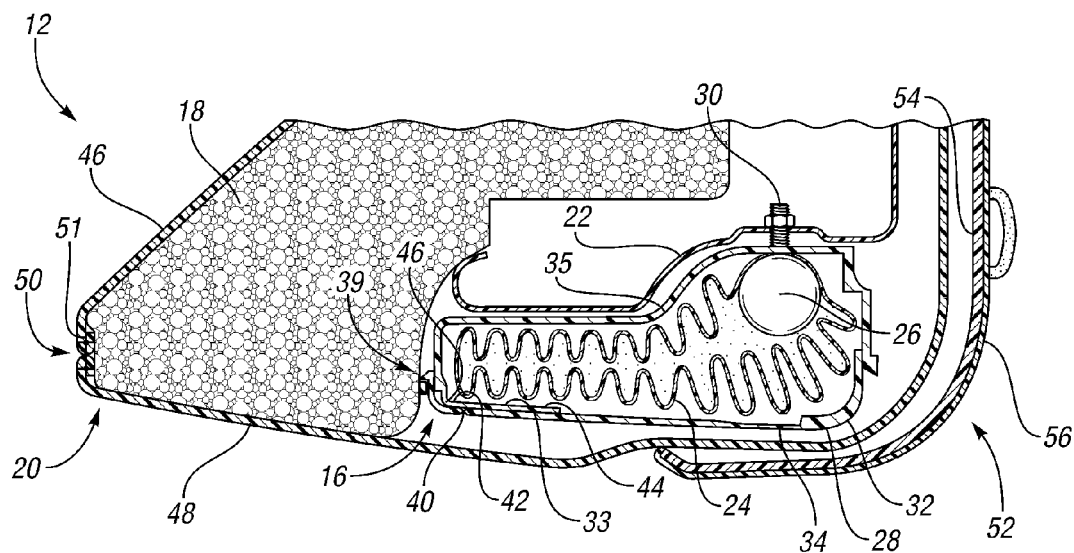
FIG. 2 is a fragmentary cross-sectional view of the seat back cushion assembly taken along line 2-2 of FIG. 1 and showing various components of the air bag module, including an inflatable air bag and a housing that receives the air bag, the housing having a main body and an extension formed integrally with the main body and being enclosed by the main body.

Referring to FIG. 2, the air bag module 16 may be disposed proximate one side of the seat back cushion assembly 12, such as an outboard lateral side or an inboard lateral side, and may be connected to a support member, such as a seat back frame 22. Alternatively, the air bag module 16 may be located in any suitable position on the seat back cushion assembly 12 or seat bottom cushion assembly 14. Furthermore, the seat back cushion assembly 12 and seat bottom cushion assembly 14 may each be provided with one or more air bag modules 16, such as outboard and inboard air bag modules 16 that each have a similar configuration and function as described below in detail.

In the embodiment shown in FIG. 2, the air bag module 16 includes an inflatable air bag 24, an inflator 26 attached to the air bag 24 for inflating the air bag 24, and a housing 28 that receives the air bag 24 and inflator 26. The inflator 26 may be connected to the frame 22, or other suitable support member, in any suitable manner, such as with one or more fasteners 30. The fasteners 30, which may each include a bolt and nut for example, may also be used to connect the housing 28 to the frame 22. Alternatively, the air bag module 16 may be connected to the frame 22, or other suitable support member, in any suitable manner.

The housing 28 may have a main body 32, such as a clam-shell body or "hard cover," that substantially surrounds the air bag 24 and inflator 26, and an extension 33 formed integrally with the main body 32 and substantially enclosed by the main body 32. For example, the housing 28 including the main body 32 and extension 33 may be molded as a single piece in an injection or compression molding process. Furthermore, the housing 28 including the main body 32 and extension 33 may comprise a relatively rigid or substantially rigid material or materials having, in at least one embodiment, a flexural modulus of 200 to 5,000 megapascals (MPa), in another embodiment a flexural modulus of 225 to 1,000 MPa, and in yet another embodiment a flexural modulus of 300 to 550 MPa (flexural modulus may be measured according to ISO 178). For example, the housing 28 including the main body 32 and extension 33 may be made of relatively rigid molded plastic material or materials, such as polypropylene, thermoplastic olefin (TPO), and/or ethylene propylene diene monomer rubber (EPDM rubber). As another example, the housing 28 including the main body 32 and extension 33 may comprise any suitable material or materials, such as flexible plastic material, and may be made in any suitable manner.

In addition, the main body 32 may have first and second housing portions 34 and 35, respectively, that are joined together in any suitable manner. For example, first ends of the housing portions 34 and 35 may be joined together by a living hinge 36, and second ends of the housing portions 34 and 36 may be attached together such as with a snap fit arrangement. As a more detailed example, referring to FIG. 3, the second end of one housing portion 34 may include one or more projections 37, such as tabs or clips, that are received in one or more openings 38 formed on the second end of the other housing portion 35 such that the housing portions 34 and 35 may be snapped or otherwise closed together at an attachment location 39.

Figure 3:
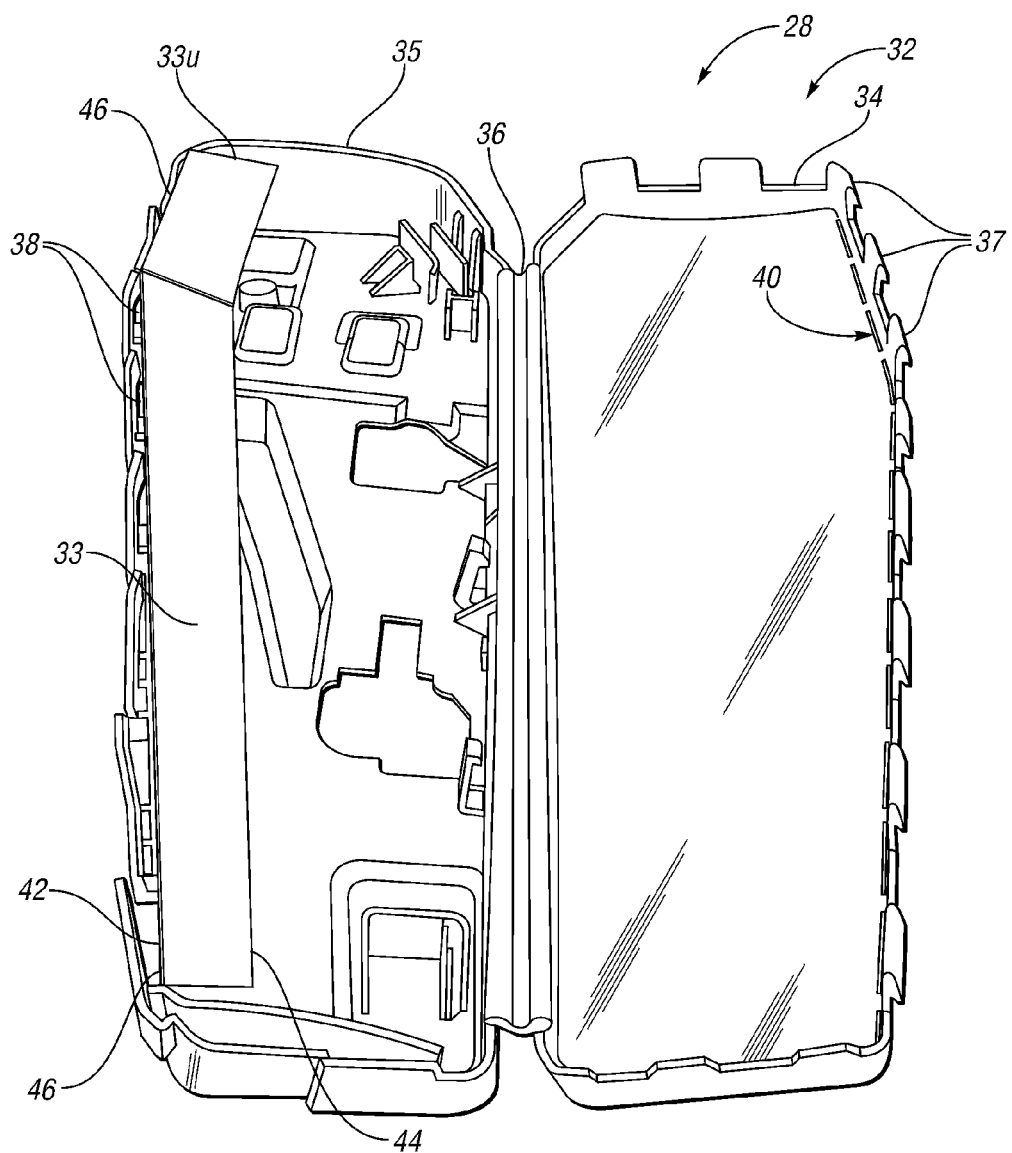
FIG. 3 is a perspective view of the housing of the air bag module, showing the main body and the integral extension.

Referring to FIGS. 2 and 3, the main body 32 may further include a deployment zone or location 40 through which the air bag 24 may deploy, as described below in detail. For example, the first housing portion 34 may include a a rupturable portion or weakened area, such as a frangible groove or seam, that is configured to rupture upon inflation of the air bag 24 to allow at least one housing portion, or a section of at least one housing portion, to move relative to the other housing portion. In the embodiment shown in FIG. 2, both housing portions 34 and 35, or sections thereof, are configured to separate. As another example, ends of the housing portions 34 and 35 may be spaced apart from each other to define a deployment opening. As another example, the above described attachment location 39 may function as the deployment location. As yet another example, the housing portions 34 and 35 may be joined together at a deployment location in any suitable manner, such as with one or more temporary or breakable fasteners.

In the embodiment shown in FIG. 2, the extension 33 of the housing 28 is disposed entirely in the main body 32 prior to inflation of the air bag 24. Referring to FIGS. 2 and 3, the extension 33 has first and second ends 42 and 44, respectively. The first end 42 is connected to the main body 32 proximate the deployment location 40 when the main body 32 is closed around the air bag 24. For example, the first end 42 may be connected to the second housing portion 35 with a living hinge 46 and in front of the deployment location 40 when the main body 32 is closed around the air bag 24. The second end 44 may be a free end that is disposed inside of the main body 32 away from the deployment location 40 prior to inflation of the air bag 24. In another embodiment, the second end 44 may be releasably attached to a portion of the main body 32, such as the first housing portion 34, and/or to the air bag 24. As a more detailed example, the second end 44 may be releasably attached to an interior surface of the main body 32 with an adhesive tape and/or temporary fastener, such as a breakable fastener.

In the embodiment shown in FIG. 2, the second end 44 of the extension 33 is disposed on an interior outboard side of the main body 32 adjacent an outboard side of the air bag 24. Furthermore, the second end 44 extends rearwardly of the deployment location 40 of the main body 32. As explained below, the second end 44 is configured to be released from the interior of the main body housing 32 during deployment of the air bag 24.

Returning to FIG. 2, the seat pad 18 may be disposed adjacent the air bag module 16 and the frame 22. For example, the seat pad 18 may be disposed in front of and along an inboard side of the air bag module 16 and frame 22, as shown in FIG. 2. As another example, the seat pad 18 may be disposed in front of and behind the air bag module 16 and frame 22. As yet another example, the seat pad 18 may be disposed on all sides of the air bag module 16 and frame 22. In at least one embodiment, the seat pad 18 is made from a molded polymeric material, such as a polyurethane foam. Alternatively, the seat pad 18 may comprise any suitable material, and may be made in any suitable manner.

The trim cover 20 may be made of any suitable material, such as cloth, vinyl and/or leather, and may be provided with or without a padding layer and/or backing layer. Furthermore, the trim cover 20 may include multiple pieces that are joined together at seams. Referring to FIGS. 1 and 2, the trim cover 20 includes first and second sections 46 and 48, respectively, that cooperate to define a deployment seam 50 through which the air bag 24 may deploy. For example, the sections 46 and 48 may be connected together such as with sewn stitching 51, as shown in FIG. 2. As another example, ends of the first and second sections 46 and 48, respectively, may not be directly connected together, but merely abut each other to define the seam 50. In the embodiment shown in FIG. 2, the first section 46 is a bolster front section that faces a seat occupant when the seat occupant is seated on the seat assembly 10, and the second section 48 is a bolster outboard side section that may face a vehicle door of a vehicle in which the seat assembly 10 is mounted. The trim cover 20 further includes additional sections not visible in FIG. 2.

Referring to FIGS. 1 and 2, in at least some embodiments, a relatively rigid panel 52 may also be provided in the rear area of the seat back cushion assembly 12 to provide support, to cover a portion of the seat back cushion assembly 12 and/or for aesthetics. The panel 52 may include a main body 54, such as a plastic molding. In addition, the panel 52 may include a cover layer 56 made of any suitable material, such as cloth, leather or vinyl, attached to the main body 54.

Figure 4:
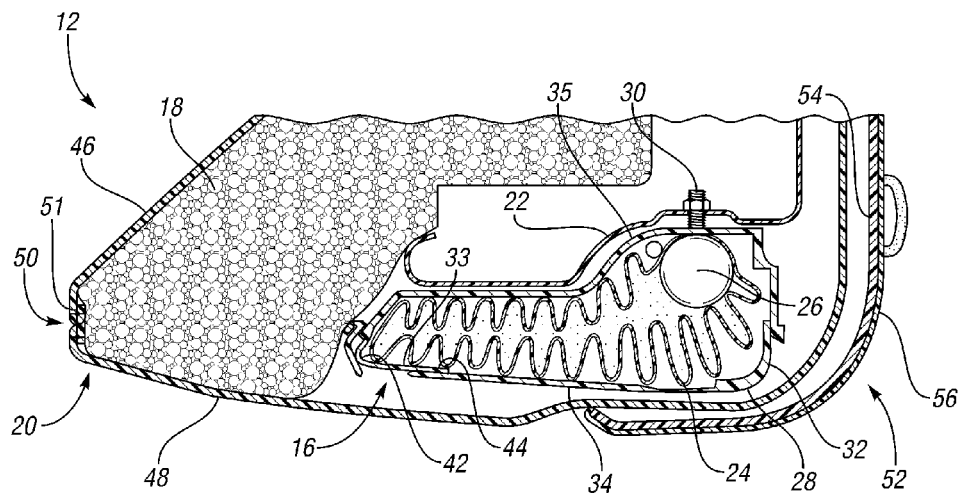
FIG. 4 is a fragmentary cross-sectional view of the seat back cushion assembly showing the air bag partially inflated.

Referring to FIGS. 2-5, operation of the vehicle seat assembly 10 will now be described in detail. Upon a sufficient triggering event, such as impact to a vehicle in which the seat assembly 10 is mounted or other sufficient acceleration or deceleration event, for example, the air bag module 16 may be activated in any suitable manner to cause the air bag 24 to deploy. For example, a controller (not shown) may energize the inflator 26 upon receiving input from a sensor (not shown) that is indicative of a sufficient triggering event. During deployment, the inflator 26 inflates the air bag 24, which causes the main body 32 of the housing 28 to open. In the embodiment shown in FIGS. 2 and 4, for example, the inflating air bag 24 causes the deployment location 40 to rupture, separate, or otherwise open, and further causes the first housing portion 34, or a portion thereof, to flex outwardly and the second housing portion 35 to move forwardly after the deployment location 40 has opened. As also shown in FIG. 4, the expanding air bag 24 may cause the extension 33 to extend outside of the main body 32 of the housing 28.

Figure 5:
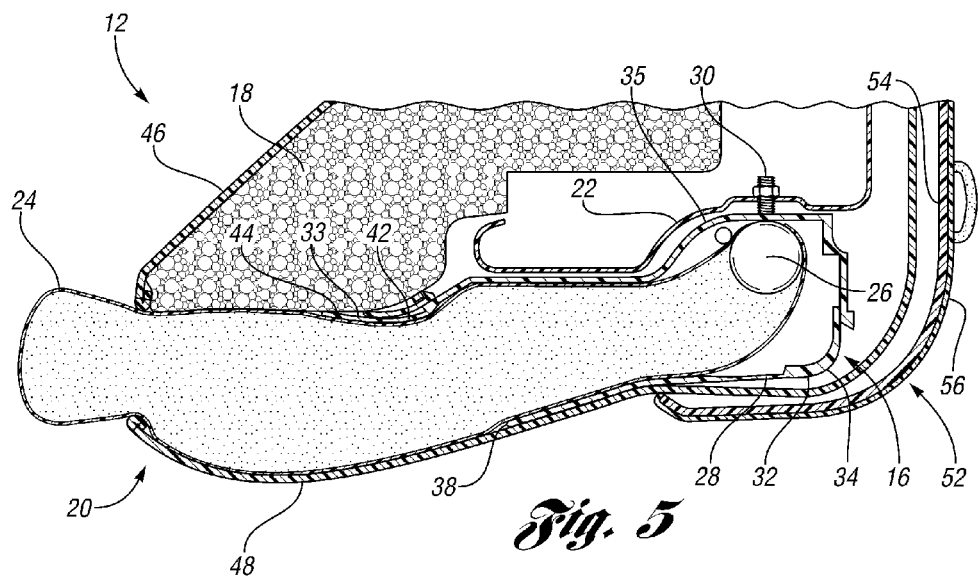
FIG. 5 is a fragmentary cross-sectional view of the seat back cushion assembly showing the air bag more fully inflated and the extension extending outside of the main body of the housing.

Referring to FIG. 5, as the air bag 24 continues to inflate, the air bag 24 may cause the second end 44 of the extension to be released from the main body 32, such that the second end 44 extends forwardly and between the seat pad 18 and the air bag 24. The inflating air bag 24 may also rupture the deployment seam 50 so that the air bag 24 may project through the trim cover 20.

With the above configuration, the extension 33 may protect the seat pad 18, by reducing contact between the air bag 24 and the seat pad 18, and inhibit or prevent portions of the seat pad 18 from breaking off during deployment of the air bag 24. The extension 33 may therefore function as a seat pad protection section or member. The extension 33 may also facilitate deployment of the air bag 24 by providing a guide surface for the air bag 24 and/or by reducing friction between the air bag 24 and the seat pad 18 or other components of the seat assembly 10.

Referring to FIG. 3, the housing 28 of the air bag module 16 may also be provided with a plurality of the above described extensions 33, such as lower extension 33 and upper extension 33u. In the embodiment shown in FIG. 3, the extensions 33 and 33u are movable with respect to each other. Furthermore, the housing 28 may be provided with any suitable number of extensions 33 that may be arranged to accommodate a variety of different configurations of the main body 32 of the housing 28.

Figure 6:
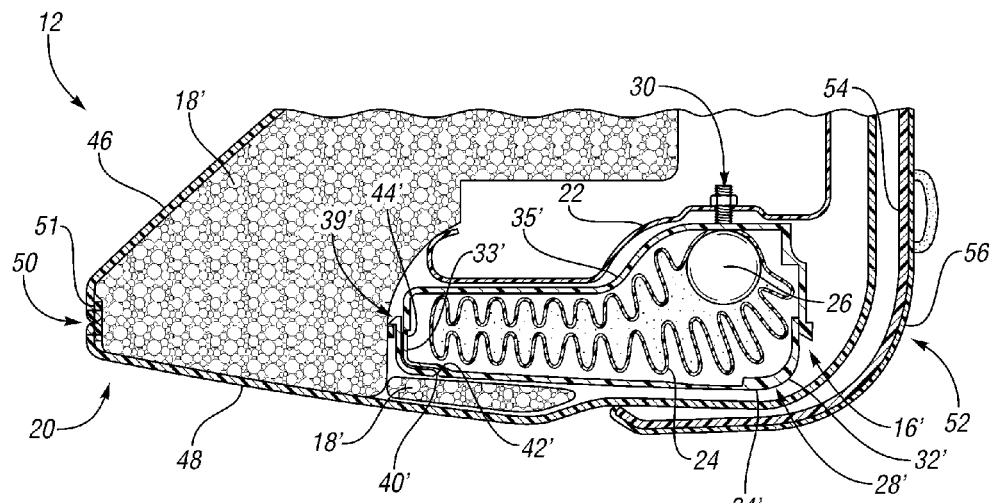
FIG. 6 is a fragmentary cross-sectional view of a seat back cushion assembly including another embodiment of an air bag module according to the present disclosure.
Figure 7:
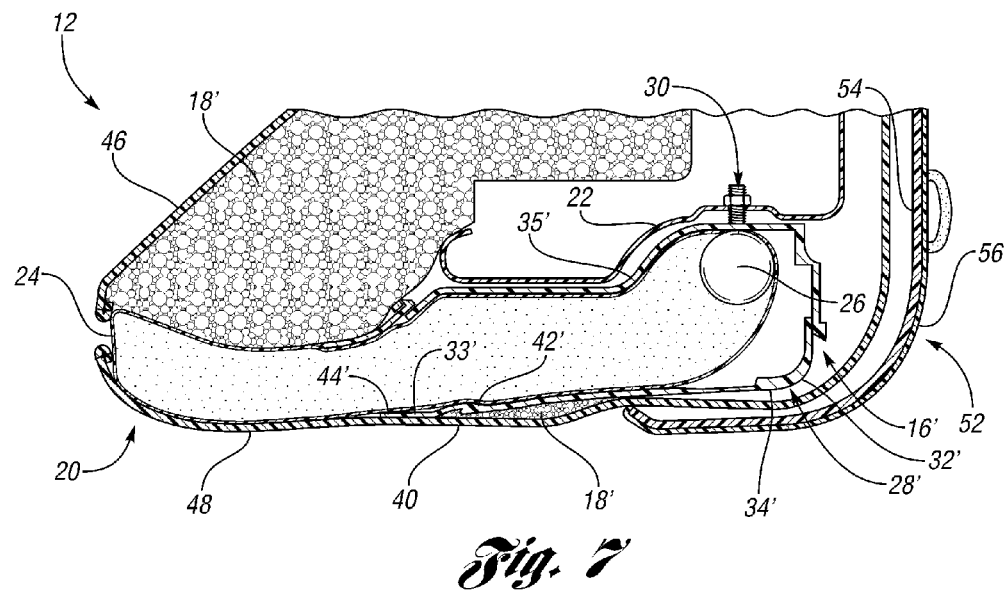
FIG. 7 is a fragmentary cross-sectional view of the seat back cushion assembly of FIG. 6, showing an air bag of the air bag module partially inflated.
Figure 8:
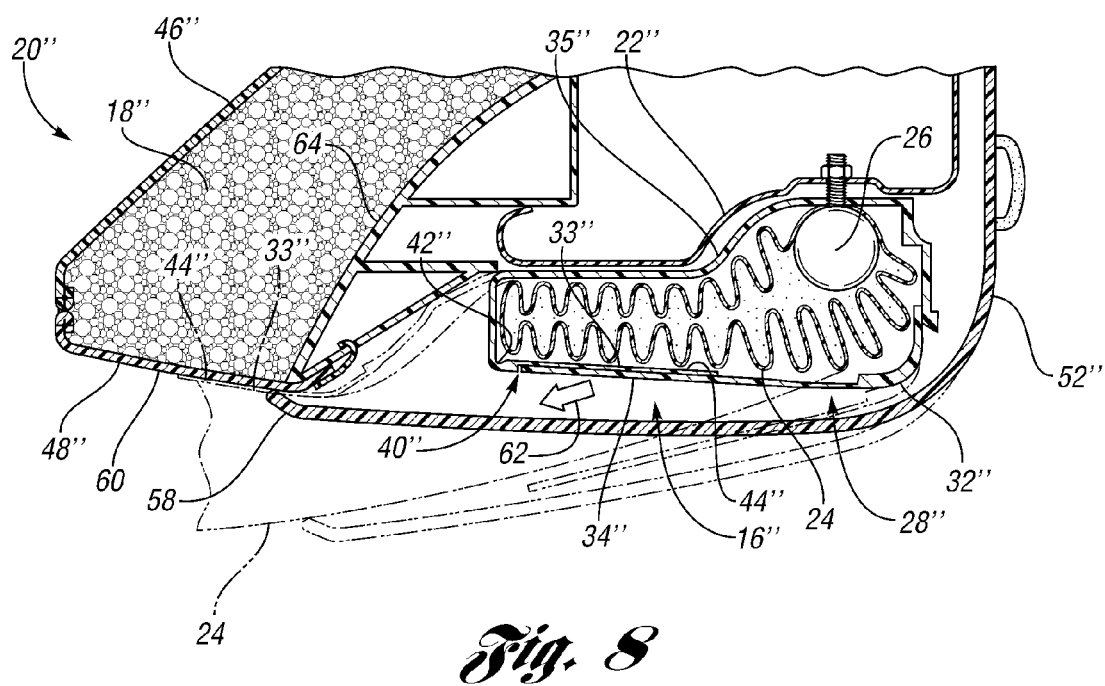
FIG. 8 is a fragmentary cross-sectional view of another seat back cushion assembly including yet another embodiment of an air bag module according to the present disclosure.

FIGS. 6-8 show additional example embodiments 16' and 16" of an air bag module according to the present disclosure for use with a vehicle seat assembly, such as seat assembly 10. These embodiments may function in a similar manner as discussed above in detail.

Like the above embodiment, in the embodiment shown in FIG. 6 air bag module 16' includes a housing 28' having a main body 32' and an extension 33' formed integrally with the main body 32'. In the embodiment shown in FIG. 6, however, a first end 42' of the extension 33' is connected to first housing portion 34' behind deployment location 40', such as with a living hinge. In addition, the extension 33' extends forwardly and along a front portion of the interior of the main body 32' of housing 28', such that second end 44' of the extension 33' is positioned in front of air bag 24.

In the illustrated embodiment, the second end 44' is received in a recessed portion of the main body 32' adjacent attachment location 39'. In another embodiment, the second end 44' may extend further inboard beyond the attachment location 39'.

With the above configuration, when the air bag 24 is inflated, the air bag 24 ruptures deployment location 40' and causes extension 33' to extend outside of main body 32' such that the second end 44' extends between the air bag 24 and second section 48 of trim cover 20, as shown in FIG. 7. If a portion of seat pad 18' is disposed on an outboard side of the air bag module 16', as shown in FIG. 7, the extension 33' may also extend between the air bag 24 and the portion of seat pad 18' upon deployment of the air bag 24.

In the above embodiment, the extension 33' may sufficiently cover any rough edges (e.g., saw tooth edges) of the first housing portion 34' that may result from rupture of the deployment location 40', such that the extension 33' may function as a protection section that protects the air bag 24 during deployment. Furthermore, the extension 33' may function as a deflector to guide the air bag 24 forwardly toward seam 50 during deployment and thereby minimize ballooning of the second section 48 of the trim cover 20. Still further, the extension 33' may sufficiently cover at least a portion of the second section 48 of the trim cover 20 and provide a smooth deployment surface for an outboard side of the air bag 24.

In the embodiment 16" shown in FIG. 8, air bag 24 of air bag module 16" deploys between back panel 52" and trim cover 20" of seat back 12" of seat assembly 10". More specifically, air bag 24 deploys in a forward deployment direction between a front portion 58 of back panel 52" and an outboard side 60 of second section 48" of trim cover 20", as shown in phantom lines in FIG. 8 and as indicated by deployment direction arrow 62. Furthermore, second section 48" of the trim cover 20" is connected, via a J-clip or other suitable fastener, to a retainer member 64, which is made of any suitable material, such as plastic, and which is attached to frame 22" in any suitable manner, such as with one or more J-clips or other fasteners. The retainer member 64 may also provide support to seat pad 18" positioned over the retainer member 64. As another example, the retainer member 64 may be omitted, and the trim cover 20" may be connected directly to the frame 22" such as with one or more J-clips.

As with the above embodiments, air bag module 16" includes a housing 28" having a main body 32" and an extension 33" formed integrally with the main body 32". In the embodiment shown in FIG. 8, however, extension 33" extends a majority of the distance between front and rear portions of the main body 32". Furthermore, deployment location 40" is defined by a gap between first and second housing portions 34" and 35", respectively.

Upon inflation of the air bag 24, the housing portions 34" and 35" separate and allow the extension 33" to extend outside of the main body 32". As a result, end 44" of the extension 33" extends forwardly between the outboard side 60 of the trim cover 20" and the air bag 24, as shown in phantom lines in FIG. 8.

In the above embodiment, the extension 33" sufficiently covers retainer member 64 and functions as a protection section that protects the air bag 24 during deployment. Furthermore, the extension 33" extends over the outboard side 60 of the trim cover 20" during air bag deployment, and provides a smooth deployment surface for the air bag 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, any of the above air bag module embodiments may be used with any suitable vehicle seat configuration, such as any of the above described seat assemblies. As another example, any of the extensions of the above described air bag module embodiments may extend between the associated air bag and any other seat component, or multiple components, to protect the air bag and/or seat component(s) during air bag deployment.

What is claimed is:

1. A vehicle seat assembly comprising:
an air bag module including an inflatable air bag and a housing that receives the air bag, the housing having a main body that substantially encloses the air bag prior to inflation of the air bag, and an extension formed integrally with the main body and being substantially enclosed by the main body prior to inflation of the air bag, the main body defining a deployment location through which the air bag is deployable, the extension having a first end connected to the main body proximate the deployment location such that the first end is disposed inside of the main body, and a second end also disposed inside of the main body, one end being disposed rearward of the other;

wherein, upon inflation of the air bag in a forward direction, the second end of the extension is configured to extend outside the main body such that the second end extends between the air bag and a component of the seat assembly.

2. The vehicle seat assembly of claim 1 wherein the main body and the extension are formed integrally as one piece.

3. The vehicle seat assembly of claim 2 wherein the main body and the extension are formed of molded plastic.

4. The vehicle seat assembly of claim 1 wherein the first end of the extension is connected to the main body in front of the deployment location.

5. The vehicle seat assembly of claim 1 wherein the first end of the extension is connected to the main body behind the deployment location.

6. The vehicle seat assembly of claim 1 wherein the first end of the extension is connected to the main body at a living hinge.

7. The vehicle seat assembly of claim 1 wherein the housing comprises a plurality of the extensions, and the extensions are movable with respect to each other.

8. The vehicle seat assembly of claim 1 wherein the component comprises a seat pad disposed outside of the main body.

9. The vehicle seat assembly of claim 1 wherein the component comprises a trim cover section.

10. The seat assembly of claim 1 wherein, prior to inflation of the air bag, the second end of the extension is disposed rearward of the first end and on an outboard side of the air bag.

11. The seat assembly of claim 1 wherein, prior to inflation of the air bag, the first end of the extension is connected to the main body at a living hinge disposed rearward of the deployment location, and the second end of the extension is disposed forward of the first end and the deployment location.

12. The seat assembly of claim 1 wherein the main body includes first and second housing portions that are joined together at an attachment location, and one of the housing portions includes the deployment location which is spaced away from the attachment location.

13. A vehicle seat assembly comprising:
an air bag module including an inflatable air bag and a plastic housing that receives the air bag, the housing having a main body that substantially encloses the air bag and that defines a deployment location through which the air bag is deployable, the housing further including a protection section formed integrally with the main body and having first and second ends, the first end being connected to the main body proximate the deployment location such that the first end is disposed inside of the main body, and the second end being disposed inside of the main body away from the deployment location prior to inflation of the air bag such that one end is disposed rearward of the other end;
a seat pad disposed in front of the housing; and
a trim cover positioned over the seat pad;
wherein, upon inflation of the air bag in a forward direction, the second end of the of the protection section is configured to extend out of the main body such that the second end extends between the air bag and at least one of the seat pad, the trim cover and another component of the seat assembly.

14. The vehicle seat assembly of claim 13 wherein the main body and the protection section are formed integrally as one piece.

15. The vehicle seat assembly of claim 14 wherein the main body and the protection section are formed of molded plastic.

16. The vehicle seat assembly of claim 15 wherein the first end of the protection section is connected to the main body at a living hinge.

17. The vehicle seat assembly of claim 16 wherein the housing comprises a plurality of the protection sections, and the protection sections are movable with respect to each other.

18. A vehicle seat assembly comprising:
an air bag module including an inflatable air bag and a housing that receives the air bag, the housing having a main body that substantially encloses the air bag prior to inflation of the air bag, and an extension formed integrally with the main body and being substantially enclosed by the main body prior to inflation of the air bag, the extension having a first end connected to the main body at a living hinge such that the first end is disposed inside of the main body, and a second end also disposed inside of the main body, one end being disposed rearward of the other end;
wherein, upon inflation of the air bag in a forward direction, the second end of the extension is configured to extend outside the main body such that the second end extends between the air bag and a component of the seat assembly.

19. A vehicle seat assembly comprising:
an air bag module including an inflatable air bag and a housing that receives the air bag, the housing having a main body that substantially encloses the air bag prior to inflation of the air bag, and an extension formed integrally with the main body and being substantially enclosed by the main body prior to inflation of the air bag, the extension having a first end connected to the main body such that the first end is disposed inside of the main body, and a second end also disposed inside of the main body, one end being disposed rearward of the other end;
wherein, upon inflation of the air bag in a forward direction, the second end of the extension is configured to extend outside the main body such that the second end extends between the air bag and a component of the seat assembly; and
wherein the housing comprises a plurality of the extensions, and the extensions are movable with respect to each other.

20. A vehicle seat assembly comprising:
an air bag module including an inflatable air bag and a housing that receives the air bag, the housing having a main body that substantially encloses the air bag prior to inflation of the air bag, and an extension formed integrally with the main body and being substantially enclosed by the main body prior to inflation of the air bag, the extension having a first end connected to the main body such that the first end is disposed inside of the main body, and a second end also disposed inside of the main body, one end being disposed rearward of the other end;
wherein, prior to inflation of the air bag, the second end of the extension is disposed rearward of the first end and on an outboard side of the air bag, and wherein, upon inflation of the air bag in a forward direction, the second end of the extension is configured to extend outside the main body such that the second end extends between the air bag and a component of the seat assembly.

* * * * *